United States Patent [19]

Imaizumi et al.

[11] Patent Number: 4,553,860
[45] Date of Patent: Nov. 19, 1985

[54] TEXT PROCESSING METHOD AND APPARATUS

[75] Inventors: Mamoru Imaizumi; Yasumichi Kojima, both of Nogoya, Japan

[73] Assignee: Brother Kogyo Kabushiki Kaisha, Aichi, Japan

[21] Appl. No.: 529,696

[22] Filed: Sep. 2, 1983

[30] Foreign Application Priority Data

Sep. 10, 1982 [JP] Japan ................. 57-158285

[51] Int. Cl.[4] ............................................. B41J 5/30
[52] U.S. Cl. ....................................... 400/68; 400/83; 364/900
[58] Field of Search ................. 400/63, 67, 68, 83, 400/625; 364/900

[56] References Cited

U.S. PATENT DOCUMENTS

| | | | |
|---|---|---|---|
| 3,025,941 | 3/1962 | Blodgett et al. | 400/68 |
| 4,031,519 | 6/1977 | Findley | 400/68 X |
| 4,064,557 | 12/1977 | Bluethman et al. | 400/68 X |
| 4,085,445 | 4/1978 | Blevins et al. | 400/68 X |
| 4,215,422 | 7/1980 | McCray et al. | 400/63 X |
| 4,220,417 | 9/1980 | Sprott et al. | 400/63 X |
| 4,374,625 | 2/1983 | Hanft et al. | 400/83 X |
| 4,396,307 | 8/1983 | Shah et al. | 400/625 |
| 4,445,795 | 5/1984 | Levine et al. | 400/68 X |

Primary Examiner—Ernest T. Wright, Jr.
Attorney, Agent, or Firm—Browdy and Neimark

[57] ABSTRACT

Method of preparing plural documents based on one text, with partial alterations from one document to another, comprising: storing into a first memory plural sets of phrase data which represent different phrases to be inserted into the respective documents and which are designated by respective phrase-indicating codes; storing into a second memory at least one set of work data comprising selected ones of the phrase-indicating codes and designated by a working-group code; storing into a third memory at least one set of text data representing a text of document and including the working-group code at a position corresponding to a part of the text which is altered; and reading out the text data from the third memory plural times corresponding to the number of the documents to be prepared, while upon reading of the working-group data, reading out from the first memory the sets of phrase data as the same are sequentially designated by the phrase-indicating codes of the work data designated by the working-group code, thereby inserting the different phrases into the respective documents. An apparatus to practice the method is also disclosed.

13 Claims, 11 Drawing Figures

FIG. 4
PHRASE MEMORY

FIG. 7
TEXT MEMORY

FIG. 9
MEMORY PRINT SUB ROUTINE

FIG. 8
MEMORY PRINT ROUTINE

TEXT PROCESSING METHOD AND APPARATUS

BACKGROUND OF THE INVENTION

The present invention relates to text or information processing method and apparatus for preparing and reproducing documents, and more particularly to a small-capacity word processor, and an electronic typewriter having a data storage capability.

A known text processing apparatus, like an electronic typewriter, which has a capability of storing texts of original documents, is commonly used for reproducing multiple copies of the same document by repeatedly printing out a stored original text without any partial changes or alterations of words or phrases from one copy to another. When it is desired to prepare mutually partially different documents such as business letters which contain the same body but different addressee's names and addresses, and different dates and which are mailed to the different persons or entities on the different dates, it has been required on such known apparatus to insert temporary stop codes in appropriate parts of the original text during storage thereof into a memory of the apparatus, and to subsequently key in desired addressee's name and address or date when a printing operation is interrupted upon reading of each temporary stop code by a controller. Such keying-in operation is effected through a keyboard during printing cycles, and consequently a user or operator of the typewriter has to attend the apparatus until all documents have been printed with partial alterations from one document to another, even when the document to be reproduced is very lengthy.

SUMMARY OF THE INVENTION

It is accordingly an object of the present invention to provide method and apparatus of printing a plurality of documents based on a text, with partial alterations of phrases or any other forms of documentary materials from one document to another.

It is another object of the invention to provide text processing apparatus and method of preparing a plurality of different documents with such partial alterations, by storing in one memory a text or body of page(s) which is common to all documents and includes at least one phrase-inserting part wherein different phrases are inserted for different documents, and storing in another memory a plurality of different phrases or groups of words which are to be inserted into such phrase-inserting part of the text of the individual documents.

According to the present invention, there is provided a method of printing a plurality of documents based on a text, with alterations of phrases or any other forms of documentary material from one document to another in at least one phrase-inserting part of the text. The instant method comprising the steps of: storing plural sets of phrase data into a phrase memory; storing at least one set of work data into a work memory; storing at least one set of text data into a text memory; and printing out the text data to produce the plurality of documents. The plural sets of phrase data represent plural different phrases to be inserted into the respective documents, and are designated by respective phrase-indicating codes each consisting of at least one character the number of which is smaller than the number of characters constituting each of the different phrases. The set of work data comprises selected plural ones of the phrase-indicating codes in such manner as to specify the order in which the phrase-indicating codes are read out. The work data is designated by a working-group code under which the phrases of the same class are designated by the corresponding phrase-indicating codes. The set of text data represents a text of document and includes the working-group code at a position corresponding to the phrase-inserting part of the text. During the printing-out of the text data to produce the first document, the first set of the phrase data designated by a first one of the phrase-indicating codes of the work data is read out from the phrase memory upon reading of the working-group code of the text memory, whereby a first one of the plural different phrase data is printed out so that the first phrase represented by the first set of phrase data is be inserted into the phrase-inserting art of the text of the first document. Similarly, the second and subsequent documents are produced by printing out the text data while printing out second and subsequent sets of the phrase data which are designated by second and subsequent ones of the phrase-indicating codes of the work data, so that the second and subsequent phrases are inserted into the phrase-inserting part of the text of the second and subsequent documents.

In accordance with the invention, there is also provided a text processing apparatus for preparing, based on a text, a plurality of documents with partial alterations from one document to another. This text processing apparatus comprises a memory device including a text memory storing at least one text data representing the text, a phrase memory storing plural sets of phrase data which represent plural different phrases to be inserted into the respective documents and which are designated by respective phrase-indicating codes, and a work memory storing at least one set of work data comprising selected plural ones of said phrase-indicating codes in such manner as to specify the order in which said phrase-indicating codes are read out. The work data is designated by a working-group code which is included at a position of the text data corresponding to a part of the text which is altered from one document to another. The apparatus further comprises a control device which is adapted to read out the text data from the text memory a number of times corresponding to the number of the documents to be prepared, and to read out from the phrase memory, upon reading of the working-group code, the plural sets of phrase data as the same are designated in sequence by the phrase-indicating codes of the work data which is designated by the working-group code, such that the plural different phrases represented by the sequentially read-out sets of the phrase data are inserted into said part of the text of the respective documents.

According to the present method and apparatus, various kinds of texts such as business forms or letters having several phrase-inserting parts into which are inserted appropriate phrases or group of words, can be stored as text data, and when the text is reproduced the phrase-inserting parts are filled with desired phrases designated by respective phrase-indicating codes of one or more sets of work data which is/are designated by working-group code(s) inserted in the text data. Thus, the different phrase-indicating codes of one set of work data correspond to the respective documents to be prepared, and the different working group codes correspond to the phrase-inserting parts of the text, so that different groups of phrases are inserted in the respective phrase-inserting parts.

An apparatus in accordance with one aspect of the invention may be provided in the form of a typewriter which comprises the previously described memory and control devices, and which further comprises: a keyboard through which the text, phrase and work data are stored into the respective memory and through which the phrase-indicating codes and the working-group codes are registered; a printer for printing the text in combination with the plural different phrases designated by the sequentially read-out sets of the phrase data; and a display for displaying the text, phrase and work data.

BRIEF DESCRIPTION OF THE DRAWINGS

The above and other objects and features of the invention will become more apparent from reading the following preferred embodiment taken in connection with the accompanying drawings in which.

DETAILED DESCRIPTION OF THE PREFERRED EMBODIMENT

The present invention will be described in detail with reference to the accompanying drawings which illustrate a preferred embodiment of an electronic typewriter having a text processing capability of the invention.

Figure 1:
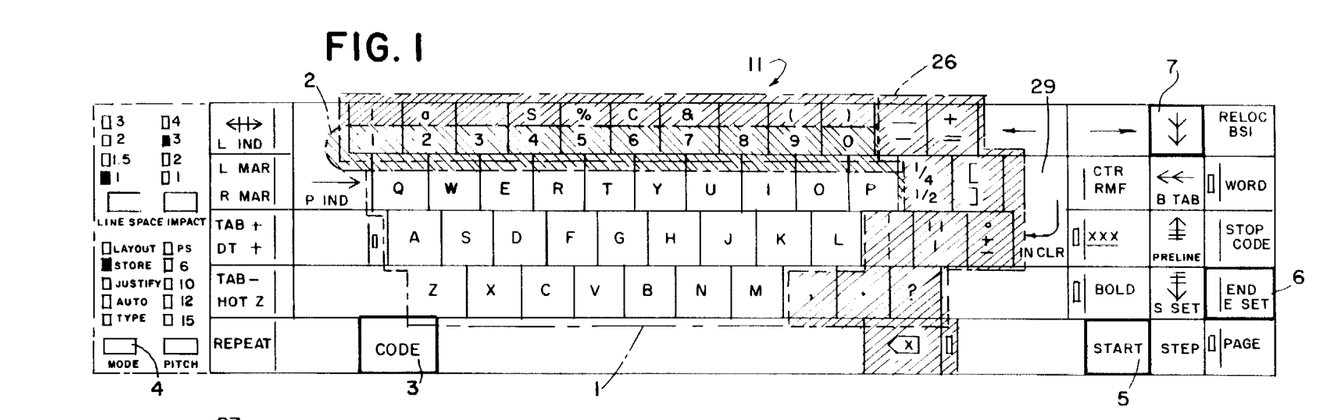
FIG. 1 is a view representing a keyboard of a text processing apparatus embodying the present invention in the form of an electronic typewriter.

There is shown in FIG. 1 a keyboard 11 of the present electronic typewriter, which includes twenty-six (26) alphabetic letter keys "A" through "Z", numeral keys "0" through "9", and a CODE key 3 which performs a special function in cooperation with the letter keys 1, numeral keys 2 and symbol keys 26 provided also on the keyboard 11. Reference numeral 4 designates a MODE key which is used to select one of five modes of operation of the typewriter: TYPE mode for normal printing; AUTO mode for automatic printing with automatic line feed; JUSTIFY mode for printing with justification (adjustment of lines to a proper length by spacing between words) at the right-hand side margin of a page; STORE mode for storing documentary data into a later described memory device 15 or editing the stored data; and LAYOUT mode for tabulation. The keyboard 11 also includes a START key 5 used to initiate operations for data storage into the memory device 15 and printing-out of the stored data, an END key 6 used to terminate the data storage into the memory device 15, and an AUTO SHEET INSERTION key 7 used to actuate an automatic sheet inserting unit 27 (FIG. 2).

Figure 2:
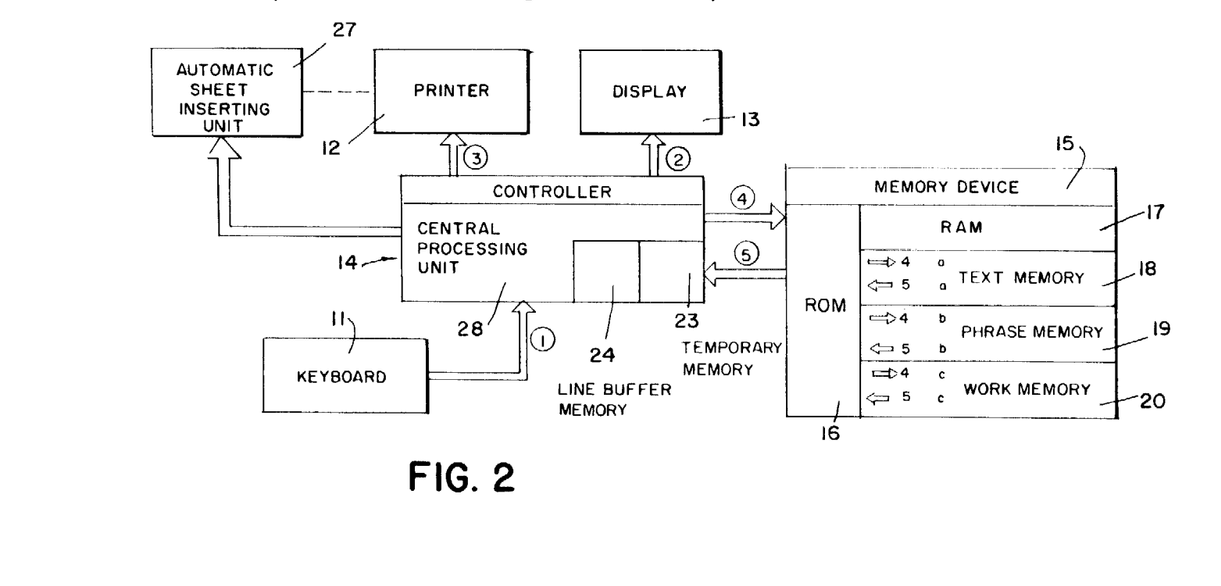
FIG. 2 is a block schematic diagram showing data flows between individual units of the typewriter.

As illustrated in FIG. 2, the present typewriter comprises, in addition to the keyboard 11 shown in FIG. 1 and the previously indicated memory device 15: a printer 12 for printing out data entered through the keyboard 11 or data stored in the memory device 15; a display 13; and a controller 14 which controls the keyboard 11, printer 12, display 13 and memory device 15. The display 13 provides a display of the data entered through the keyboard 11 and commands transferred from the controller 14. The controller 14 includes a central processing unit 28 which selects and controls the keyboard 11, the display 13, and the memory device 15. This memory device 15 includes a read-only-memory ROM 16 which permanently stores a program for controlling individual operations of the typewriter, and further includes a working memory (RAM) 17 which temporarily stores data during operation of the typewriter. The working memory 17 comprises a TEXT memory 18 for storing TEXT data representing texts of documents, a PHRASE memory 19 for storing PHRASE data representing a plurality of idioms, addresses, names of persons or firms, and other phrases or groups of words of less than a predetermined length, and a WORK memory 20 which stores WORK data representing plural groups of phrase-indicating codes designating the respective sets of PHRASE data stored in the PHRASE memory 19. Those groups of phrase-indicating codes are used for inserting selected ones of the stored phrases into respective documents which are prepared based on a selected one of the texts stored in the TEXT memory 18.

The data stored or to be stored in the working memory 17 is designated by a combination of the CODE key 3 and an appropriate one of the letter keys 1 or numeral keys 2. More particularly, a maximum of ten sets of TEXT data representing different texts labelled [0] through [9] may be stored and selected by simultaneous depression of the CODE key 3 and one of the ten numeral keys "0" through "9". Thus, an appropriate numeral key 2 is used together with the CODE KEY 3 when a text is newly stored or a stored text is accessed for printing out or editing. Similarly, up to twenty-two sets of PHRASE data representing different phrases labelled [A] through [V] may be stored and selected by simultaneous depression of the CODE key 3 and an appropriate one of the twenty-two letter keys "A" through "V". The remaining four letter keys "W" through "Z" are used with the CODE key 3 to designate up to four sets of WORK data which are identified by respective working-group codes "W" through "Z" and each of which comprises a group of phrase-indicating codes which identify the respective sets of phrase data of the same class stored in the PHRASE memory 19. For example, a group of phrase-indicating codes "A", "B" and "C" identifying stored phrases [A] through [C] which represent different addresses are stored as WORK data [W] in the WORK memory 20. It is noted that only the phrase-indicating codes "A" through "V" are stored in the WORK memory 20 while the corresponding sets of PHRASE data [A] through [V] are stored in the PHRASE memory 19.

Prior to providing a detailed operational description of the typewriter with reference to the accompanying block schematic diagrams, there will be described in brief the manner of storing the above discussed TEXT, PHRASE and WORK data into the working memory RAM 17 and the manner of printing out the stored data.

When it is desired to store data into the RAM 17, the STORE mode is selected by manipulating the MODE key 4. To store TEXT data [0], for example, the numeral key "0" is depressed simultaneously with the CODE key 3. With this depression of the keys, a memory location for the TEXT data [0] is prepared in the TEXT memory 18, and the display 13 indicates "TEXT MEMORY [0]" which informs the operator that the operating procedure which has been taken is correct. Then, the START key 5 is depressed to complete the preparation for the storage of the TEXT data [0]. Now, the TEXT memory 18 is ready to accept lines of characters which are keyed in through the keyboard 11 in an ordinary typing manner. Thus, the text [0] is stored at the appropriate memory location in the TEXT memory 18. In the meantime, the keyed-in characters are sequentially displayed on the display 13. The displayed characters are printed by the printer 12, for example, after each depression of a Carriage Return key 29. When all TEXT data [0] necessary to constitute the text [0] has been entered, the END key 6 is depressed to complete the storage of the text [0] in the TEXT memory 18.

When another text is stored in the TEXT memory 18, the CODE key 3 is depressed simultaneously with one of the numeral keys 2 other than the numeral key "0", for example, numeral key "1". In this instance, the text [1] can be stored at another memory location in the TEXT memory 18, with the same procedure as stated above.

The same procedures are used for storing the TEXT data into the TEXT memory 18 substantially apply to the storage of the PHRASE and WORK data into the PHRASE and WORK memories 19 and 20. In these instances, the desired phrases [A]-[V] to be inserted into the selected stored texts [0]-[9], and the phrase-indicating codes "A" through "V" are stored through the keyboard 11 into the PHRASE and WORK memories 19, 20 as the PHRASE data [A]-[V] and the WORK data [W]-[Z], respectively.

Some differences exist between the TEXT data and the PHRASE data. In more detail, each TEXT data representing a text of document includes information which determines right and left margin positions, tabulation positions, position of the first line from the top of a sheet or page, line spacing, pitch between words, and other formatting elements necessary for the document. This is not the case with the PHRASE data in the PHRASE memory 19 which does not contain any formatting elements (such as tabulation and margin positions), but merely represents a frequently used idiomatic phrase, name of a firm, name of an addressee, or the like.

Any data which has been stored in the TEXT, PHRASE and WORK memories 18, 19 and 20, can be edited for addition, alteration and deletion while observing the display 13, by obtaining an access to the desired TEXT, PHRASE or WORK data (text [0]-[9], phrase [A]-[V] or working-group code "W"-"Z") through depression of the appropriate character key 1, 2 and the CODE key 3.

To print out the TEXT data, for example, which has been stored in the TEXT memory 18 in the manner briefly described above, the STORE mode is first changed to one of the TYPE, AUTO, JUSTIFY and LAYOUT modes by operating the MODE key 4, and then the CODE key 3 and an appropriate one of the numeral keys "0" through "9" are simultaneously depressed to call the TEXT data representing the desired text [0]-[9]. Successively, the START key 5 is activated to initiate the printing operation. If the TEXT data includes at its end an automatic sheet insertion command (entered through simultaneous depression of the CODE key 3 and the AUTO SHEET INSERTION key 7), the automatic sheet inserting unit 27 is actuated to automatically eject the printed sheet of paper 30 (FIG. 3) and load a new sheet, and the printing of the second document or the second page of the same document is initiated based on the selected text. In the event that no automatic sheet inserting unit 27 is provided the typewriter is placed in the stand-by condition with the display 13 giving an alarm to indicate the insertion of a new sheet of paper.

Figure 3:
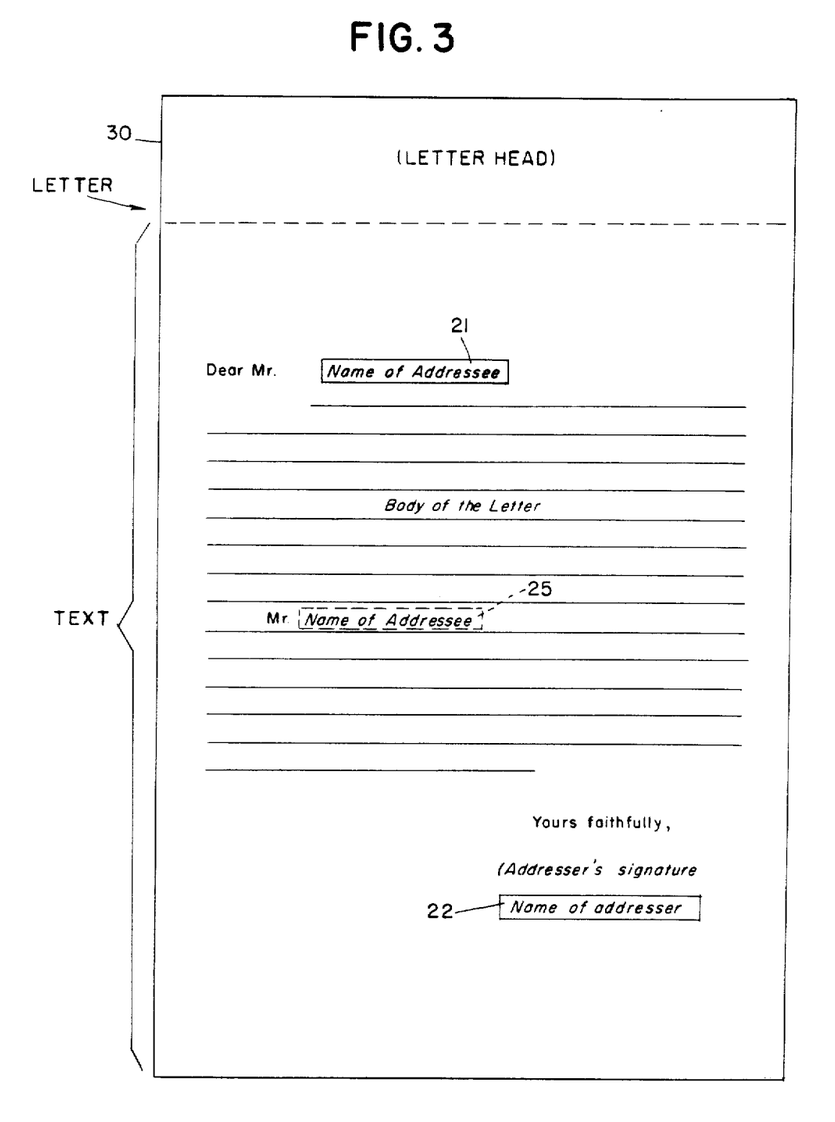
FIG. 3 is a view illustrating an exemplary document which is prepared by the instant apparatus.

Referring next to FIG. 3, and the block schematic diagrams of FIGS. 4 through 9, the operation of the present electronic typewriter is hereinafter described in detail in connection with the preparation of plural documents based on a text having two phrase-inserting parts 21, 22, as shown in FIG. 3, into which different or the same phrases are inserted when the text is reproduced into the different documents. In this particular example wherein a letter of the same body is reproduced so as to bear different addressees and the same addresser, names of the different addressees are inserted in the upper phrase-inserting part 21, and the name of the addresser is inserted in the lower phrase-inserting part 22. In the present example, the addressees are supposed to be Mr. Imaizumi, Mr. Kojima, Mor. Ogawa, Mr. Mutoh and Mr. Hayashi, and the addresser Mr. Ueno. While the TEXT, PHRASE and WORK data may be stored in any desired order, they are stored in the order of PHRASE, WORK and TEXT in the present example for easier understanding of the invention.

Figure 4:
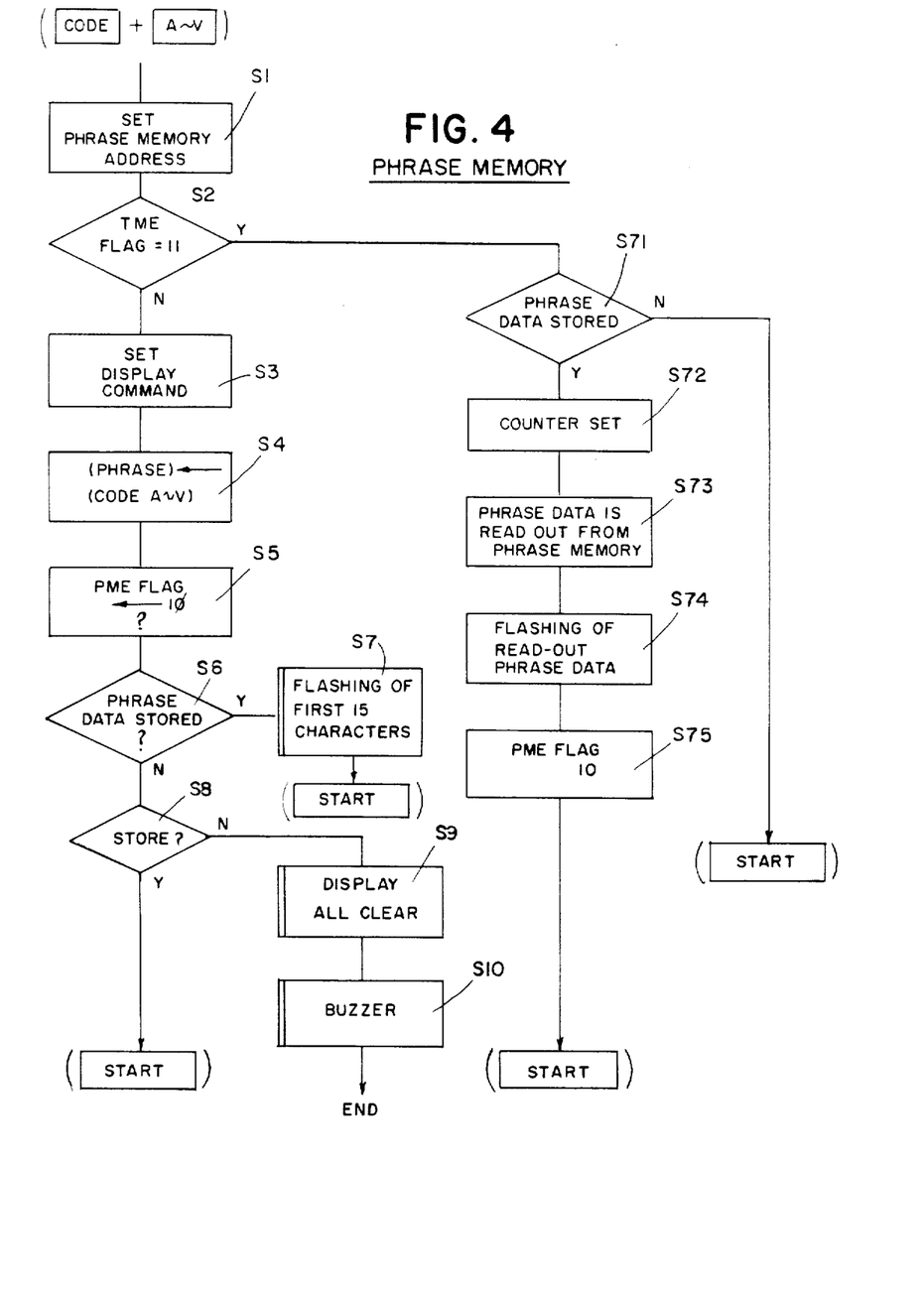
FIG. 4 is a block schematic diagram showing a sequence of operation upon simultaneous depression of a CODE key and any one of letter keys "A" through "V" which identify respective sets of PHRASE data stored or to be stored in a PHRASE memory.

When PHRASE data representative of an addressee's or addresser's name is stored into the PHRASE memory 19, one of the letter keys "A" thorugh "V" is depressed simultaneously with the CODE key 3. For example, when the name of the first addressee "Imaizumi" is stored as PHRASE data [A] representing a phrase [A], the letter key "A" and the CODE key 3 are depressed at a time. With this operation, the controller 14 within the typewriter will execute a sequence of operation as shown in FIG. 4 according to a program stored in the ROM 16. At first, the address in the PHRASE memory 19 at which the PHRASE data "Imaizumi" is stored, is set in Step S1. Then, in Step S2, a judgement is made as to whether a text memory flat (TME FLAG) is "11" or not. The abbreviation "TME" represents the TEXT memory. Similar abbreviations "PME" and "WME" which are used in the block diagrams represent the PHRASE and WORK memories, respectively. Each of the "TME FLAG", "PME FLAG" and "WME FLAG" has four states:

"00" representing the state in which any one of the following states is not established;

"01" representing the state in which the data stored in the appropriate memory may be edited;

"10" representing the state in which a predetermined number of leading characters of the appropriate stored data is displayed; and "11" representing the state in which data may be stored into the appropriate memory.

Going back to Step S2, the judgement of "TME FLAG=11?" at the present moment is negative (N) since the TME FLAG is currently set at "00". As a result, the program goes to Step S3 wherein a DISPLAY command is generated causing the display 13 to indicate "PHRASE MEMO [A]". In the next Step S4, a phrase indicating code "A" designated by the letter key "A" is stored. Then, in Step S5, the PME FLAG "10" is established. The Step S5 is followed by Step S6 wherein a judgement is made as to whether or not any data has been stored in connection with the phrase-indicating code "A". If this judgement is affirmative (Y), i.e., if the PHRASE data [A] representing for example the addressee's name "Imaizumi" has been stored, the display 13 will flash to alternately indicate "PHRASE MEMO [A]"and "IMAIZUMI", in Step S7. At this time, a maximum of first fifteen characters of the stored data is displayed, and the controller 14 waits for depression of the START key 5 for printing or editing the stored data. In this example, however, the PHRASE data [A] has not been stored in fact. Consequently, the judgement in Step S6 is negative (N) and the program goes to Step S8 in which a judgement is made as to whether or not the typewriter is currently placed in the STORE mode. If it is held in the STORE mode, the controller 14 is ready to accept data entry through the keyboard 11 after depression of the START key 5. If the STORE mode is not established, it means an erroneous keying-in operation because the letter key "A" would not have been depressed together with the CODE key 3 if the STORE mode had not been established, and for this reason, the program goes to Step S9 to clear the display 13 and to Step S10 in which a buzzer is turned on to give an alarm and the program is ended. In fact, the STORE mode has been established and therefore the typewriter is prepared for entry of the PHRASE data [A] through the keyboard 11, i.e., data representing the first addressee's name "IMAIZUMI".

Figure 5A:
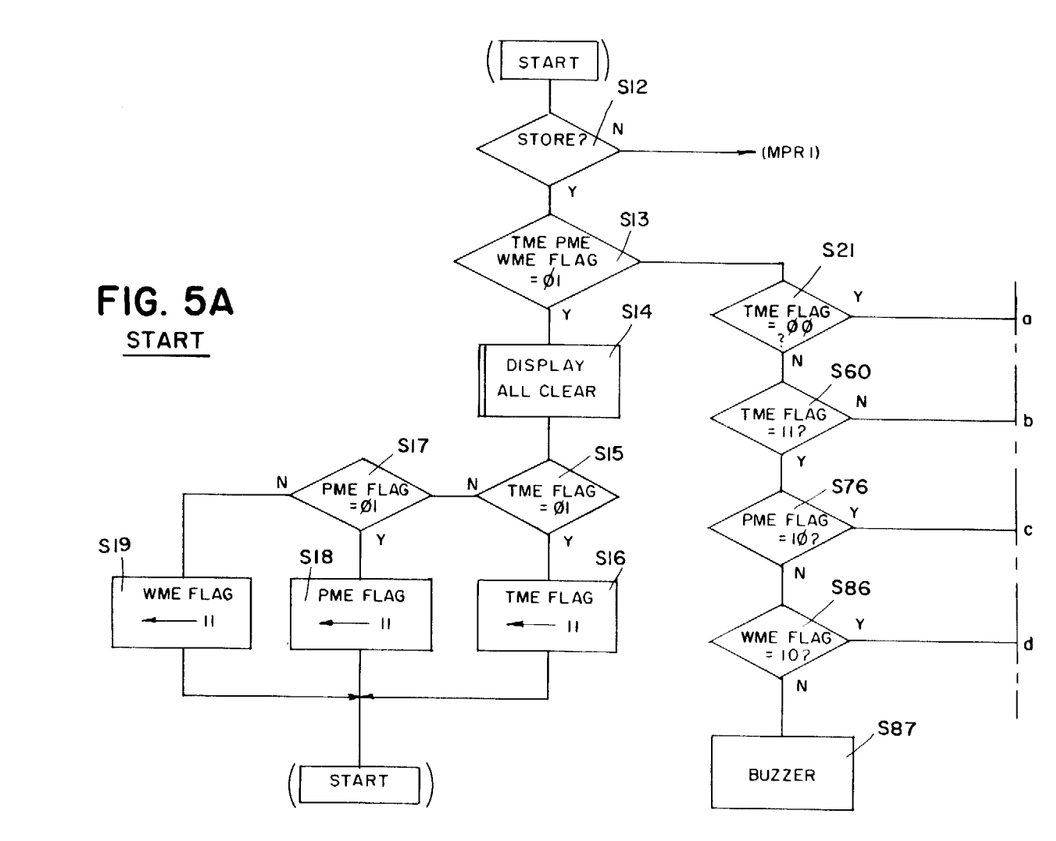
FIGS. 5A, 5B and 5C are block schematic diagrams showing a sequence of operation upon depression of a START key.
Figure 5B:
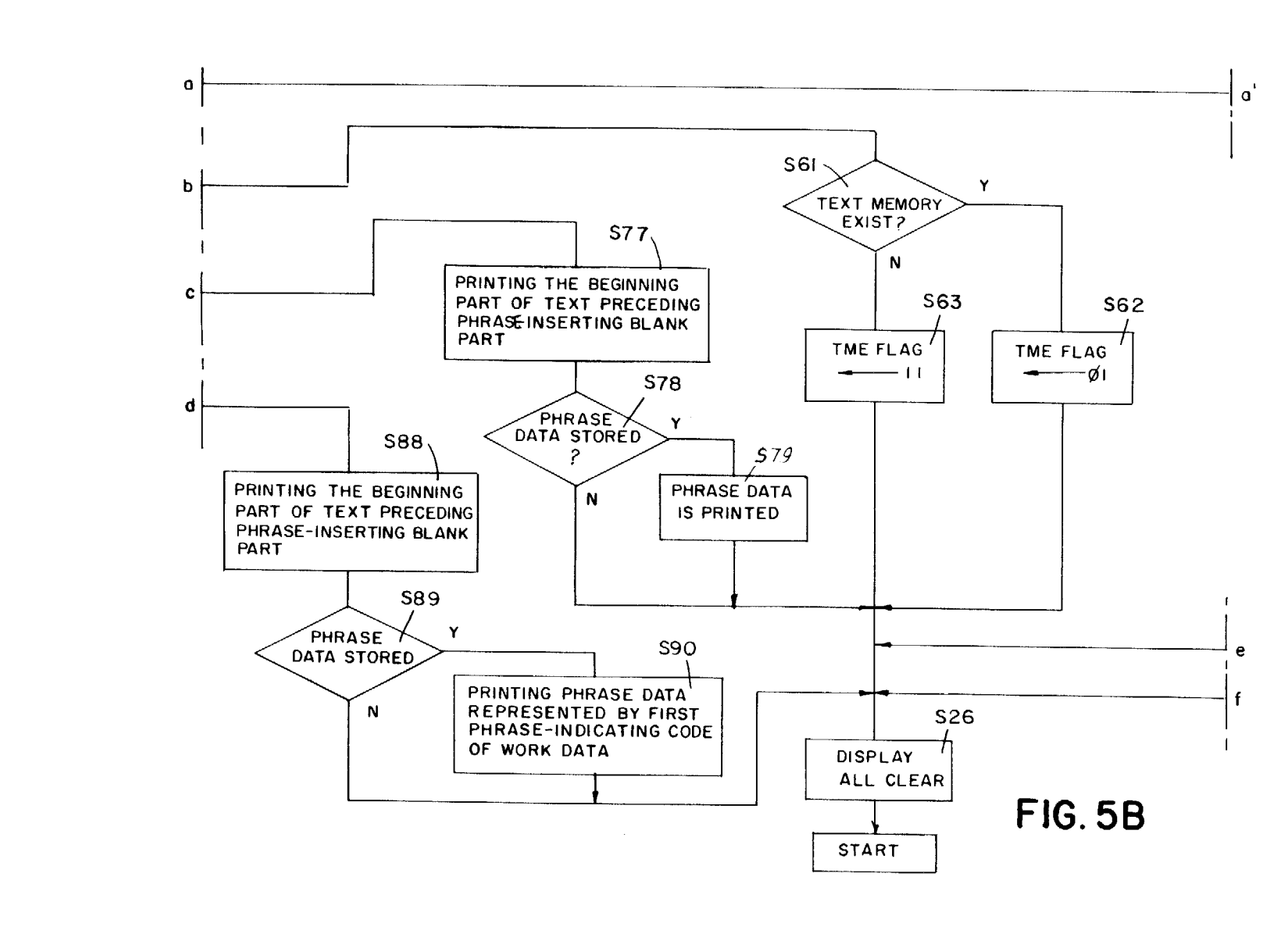
Figure 5C:
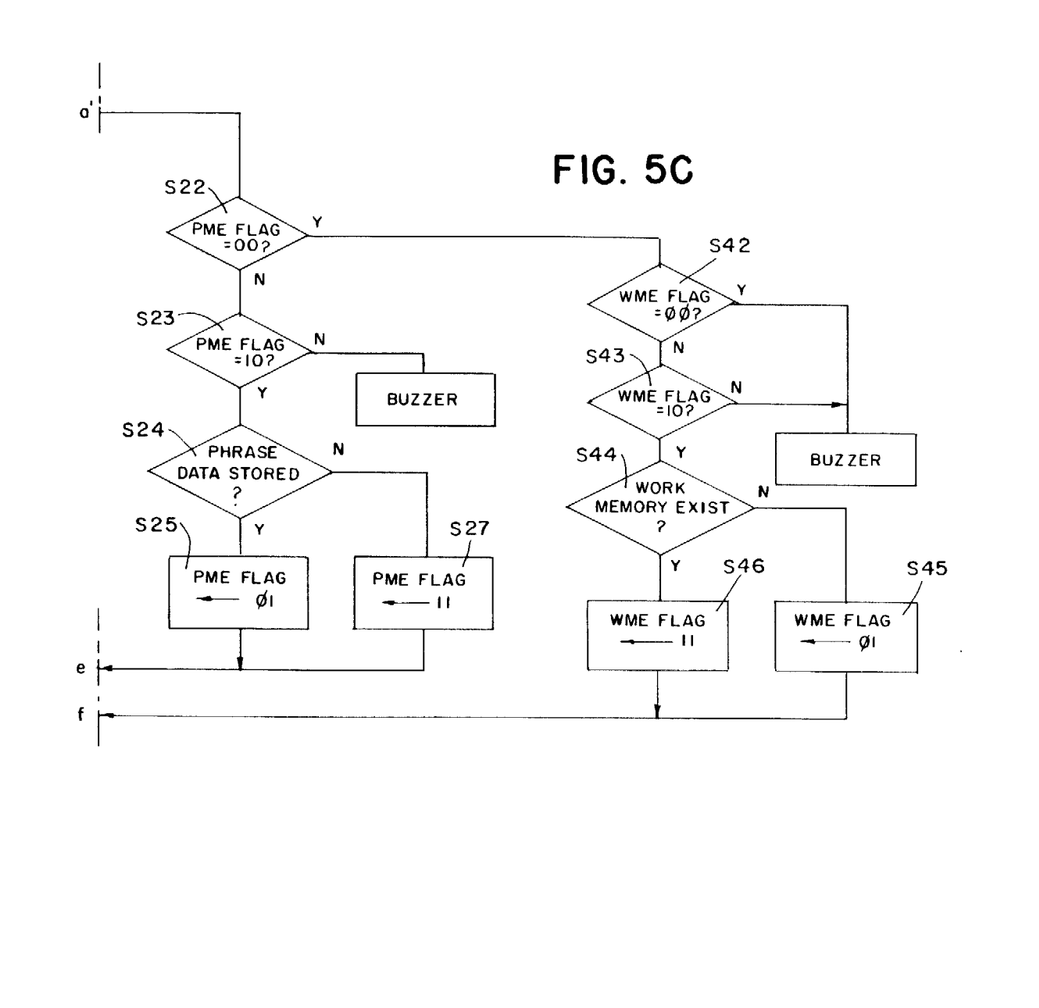

Upon depression of the START key 5 in the above condition, a sequence of operation as illustrated in FIGS. 5A–5C is executed (these Figures should be considered together and the reference characters a, b, c, d, e, f and a' are provided to identifiy paths of logic flow from one Figure to the next). Stated more specifically, a judgement is made in Step S12 as to whether or not the STORE mode has been established. Since the typewriter is now placed in the STORE mode, Step S13 is then implemented to check to see whether one of the TME FLAG, PME FLAG and WME FLAG is set at "01" or not. If any of these flags is set at "01", Steps S14 through S19 are implemented to change the appropriate TME, PME or WME FLAG from "01" state to "11" state, i.e., the state in which the data may be stored in the appropriate TEXT, PHRASE or WORK memory 18, 19 or 20. In other words, the state "01" of the TME FLAG, PME FLAG or WME FLAG means that the typewriter has been placed in the edit mode, and the change of state from "01" to "11" signifies that the depression of the START key 5 while in the edit mode will result in automatic change from the edit mode to the STORE mode. In the present example, however, none of the TME FLAG, PME FLAG and WME FLAG is currently set at "01", and consequently the program goes to Step S21 wherein a judgement is made as to whether or not the TME FLAG is set at "00". As the TME FLAG is now set at "00", the program goes to Step S22 to make a judgement of "PME FLAG=00?". Since the PME FLAG was set at "10" in Step S5, the judgement in Step S22 is negative (N) and the next judgement of "PME FLAG=10?" is conducted in Step S23. This judgement is affirmative (Y), and therefore Step S24 is executed to judge whether the PHRASE data [A] has been stored or not. If the PHRASE data [A] representing "IMAIZUMI" was stored, an alternate flashing display of "PHRASE MEMO [A]" and "IMAIZUMI" is provided on the display 13 as previously described in connection with Step S7, and the PME FLAG is set at "01" (edit state) in Step S25 which is followed by Step S26 to clear the display 13, and the typewriter becomes ready to accept data entry through the keyboard 11 after depression of the START key 5. In fact, the PHRASE data [A] has not been stored in the PHRASE memory 19, the program goes to Step S27 wherein the PME FLAG is set at "11"(STORE mode). Then, the display 13 is cleared in Step S26 and the typewriter is set ready to accept data entry through the keyboard 11 as described above. In this condition, the PHRASE data [A] representing the phrase "IMAIZUMI" may be stored by pressing the appropriate letter keys 1 on the keyboard 11. If the judgement in Step S23 is negative (N), an alarm buzzer is turned on.

Similarly, PHRASE data [B] representing the second addressee's name "KOJIMA" may be stored into the PHRASE memory 19 by simultaneously depressing the CODE key 3 and the letter key "B", depressing the START key 5 and keying in "KOJIMA" through the keyboard 11. The same procedure is' used to store PHRASE data [C], [D] and [E] representing the third, fourth and fifth addressees' names "OGAWA", "MUTOH" and "HAYASHI", respectively.

Successively, the data representing the addresser's name "UENO" is stored as PHRASE data [F] by depressing the letter key "F" simultaneously with the CODE key 3, actuating the START key 5 and entering the addresser's name through the keyboard 11.

The above operation completes the data storage into the PHRASE memory 19 necessary for insertion of the five different addressees' names into five letter documents of the same body which are mailed by Mr. UENO to the five different persons.

Figure 6:
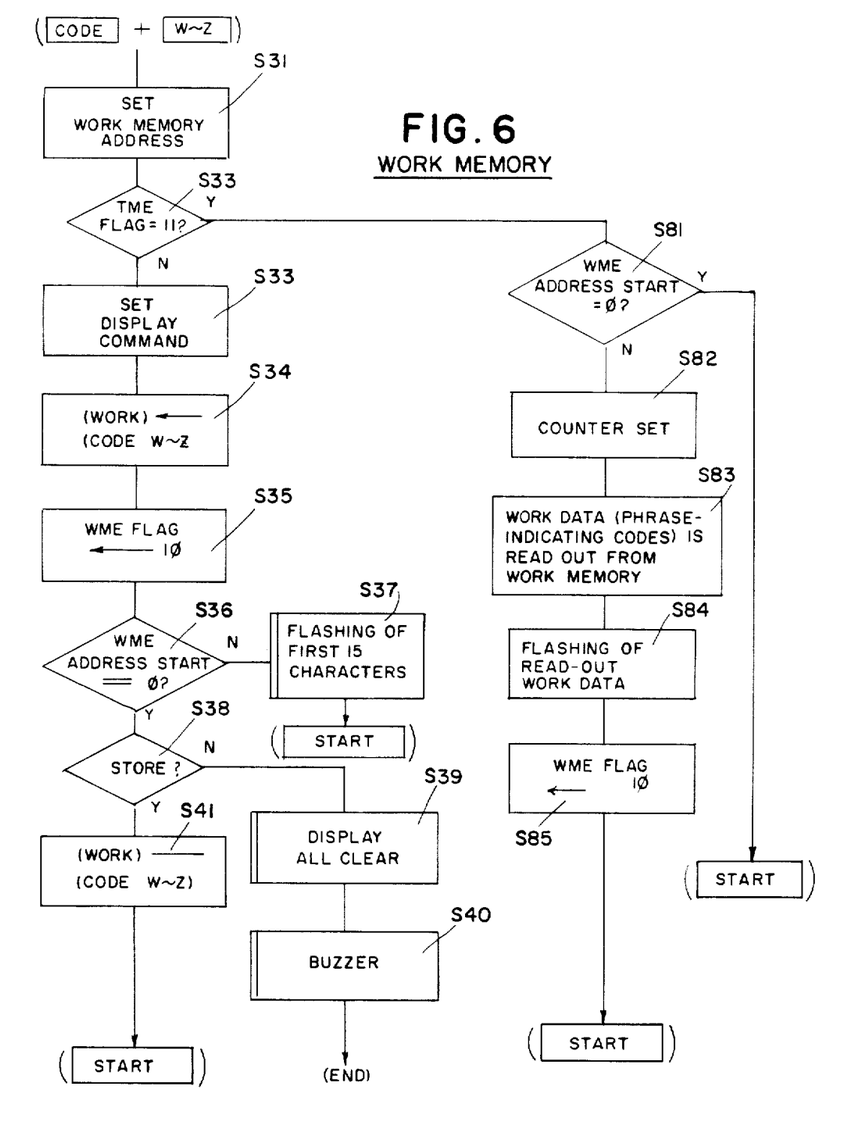
FIG. 6 is a block schematic diagram showing a sequence of operation upon simultaneous depression of the CODE key and any one of the remaining letter keys "W" through "Z" which identify respective sets of WORK data stored or to be stored in a WORK memory to represent groups of phrase-indicating codes designating the PHRASE data stored in the PHRASE memory.

The WORK data may be stored into the WORK memory 20, in substantially the same manner as used for storing the PHRASE data, according to the block diagrams of FIG. 6. Upon simultaneous depression of the CODE key 3 and the letter key "W", Steps S31, S32 and S33 are performed and the display 13 provides a display of "WORK MEMORY [W]". Successively, Steps 34, S35, S36, S38 and S41 are executed before the START key 5 is depressed at the start of the sequential operation shown in FIGS. 5A-5C. With the START key 5 depressed, Steps S12, S13, S21 and S22 are performed and then Steps S42 through S45 and S26 are followed, whereby the WME FLAG is set at "01", and the typewriter waits for the depression of the START key 5 after the display 13 has been cleared. In this condition, the WORK data [W] is stored by keying in the phrase-indicating code "A", "B", "C", "D" and "E" through the keyboard 11, more specifically, by simultaneously depressing the CODE key 3 and the letter key "A", then the CODE key 3 and the letter key "B", and so on. Thus, the stored PHRASE data, i.e, phrases [A] through [E] are registered as the WORK data [W] or under the working-group code "W". It is noted in connection with Step S36 that if the judgement reveals that any WORK data, e.g., phrase-indicating codes "A" through "E" have been stored under the working-group code "W", these codes and the message "WORK MEMORY [W]" are alternately displayed in a flashing manner on the display 13 in Step S37, and the program goes to Step S46 wherein the typewriter is set in the edit state, as previously discussed in connection with the PHRASE data. When it is found in Step S38 that the STORE mode has not been established, the display 13 is cleared in Step S39 and an alarm buzzer is turned on in Step S40. If the judgement in Step S42 is affirmative (Y) or if the judgement in Step S43 is negative (N), an alarm buzzer is turned on.

Then, WORK data [X] is stored in the WORK memory 20 by first depressing the letter key "X" and the CODE key 3, then depressing the START key 5, and keying in five phrase-indicating codes "F" in succession, i.e., depressing the letter key "F" five times while the CODE key 3 is held depressed. Thus, the first phrase [A] of the first group of phrases registered under the working-group code "W" appears on the first document in combination with the first phrase [F] of the second group registered under the working-group code "X", and the second and subsequent phrases [B] through [E] of the first group appear on the second and subsequent documents in combination with the second and subsequent phrases [F] of the second group, respectively.

Figure 7:
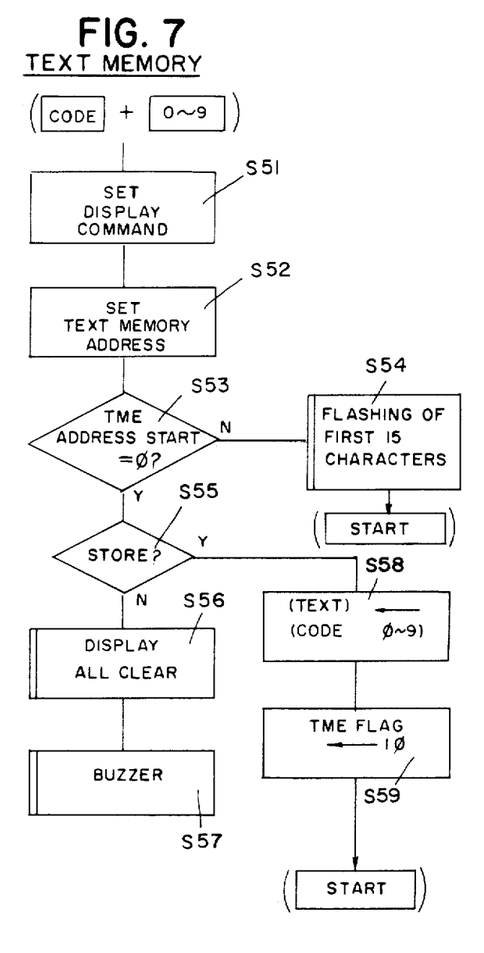
FIG. 7 is a block schematic diagram showing a sequence of operation upon simultaneous depression of the CODE key and any one of numeral keys "0" through "9" which identify respective sets of TEXT data stored or to be stored in a TEXT memory to represent primary documents, i.e., texts of documents.

Now, the necessary PHRASE and WORK data have been stored in the PHRASE and WORK memories 19 and 20. Referring further to FIG. 7 in connection with FIG. 4, the manner of storing TEXT data into the TEXT memory 18 will be described below. As shown in FIG. 7, a desired one of the numeral keys 2, for example, numeral key "0" is depressed simultaneously with the CODE key 3. Then, the program proceeds with the execution of Step S51 wherein the display 13 indicates "TEXT MEMORY [0]". In the next Step S52, the appropriate address in the TEXT memory 18 is set. Then, Step S53 is executed to judge whether any data has been stored as the text [0] or not. If the text [0] has been already stored, Step S54 is implemented to provide an alternate display of "TEXT MEMORY [0]" and the first fifteen characters of the stored TEXT data [0] representing the text [0]. If no data has been stored as TEXT data [0], the program goes to Step S55 in which a judgement is made as to whether or not the typewriter is placed in the STORE mode. In the event that the STORE mode has not been established, an alarm buzzer is activated through Steps S56 and S57 because the numeral key "3" is not normally depressed with the CODE key 3 while the typewriter is not placed in the STORE mode. In this example, however, the STORE mode is currently selected, and therefore the judgement in Step S55 is affirmative (Y). As a result, Steps S58 and S59 are executed to store the text code "0" and set the TME FLAG at "10", whereby the typewriter becomes ready to accept data entry through the keyboard 11 after depression of the START key 5.

Upon depression of the START key 5 as indicated at the start of the operational sequence shown in FIGS. 5A-5C, the program goes to Steps S12, S13 and S21.

Since the TME FLAG was previously set at "10" in Step S59, a negative judgement (N) is obtained in Step S21 and consequently the Step S21 is folowed by Step 60 the judgement of which is negative (N). In consequence, the program goes to Step S61 to check to see if any data has been stored as the TEXT data [0] or not. If the TEXT data [0] has been stored, the TME FLAG is set to "01" in Step S62 (edit state) to allow an editing operation of the stored data. Since the TEXT data [0] has not been stored, the TME FLAG is set to "11" in Step S63 and the display "TEXT MEMORY [0]" on the display 13 is cleared in Step S26, thereby allowing the typewriter to accept data entry through the keyboard 11. In this condition, therefore, a desired material may be entered as the TEXT data [0] representing the text [0].

While the TEXT data is being stored in the TEXT memory 18, the printer 12 is operated to print a succession of keyed-in characters, for example, upon each depression of a CARRIAGE RETURN key 29. This printing operation is not described in detail because it is a known arrangement which is not directly concerned with the subject matter of the present invention.

When the upper phrase-inserting part 21 is reached following the words "Dear Mr." as shown in FIG. 3, the CODE key 3 is depressed together with an appropriate one of the letter keys "A" through "V" designating the desired phrase (addressees' name) or an appropriate one of the remaining letter keys "W" through "Z" designating the desired working-group code. In this instance, the controller 14 of the typewriter will perform the processing operation as described below.

If, for example, the letter key "A" is depressed together with the CODE key 3, the judgement in Step S2 of FIG. 4 is affirmative (Y) and therefore Steps S71 through S75 are executed. In Step S71, a judgement is made as to whether or not the PHRASE data [A] has been stored. If this judgement is negative (N), the typewriter becomes ready to accept data entry through the keyboard 11 after depression of the START key 5. At this time, however, the phrase "IMAIZUMI" has been stored as the PHRASE data "A" and as a result, the affirmative judgement is obtained in Step S71. Then, the number of characters of "IMAIZUMI" is set on a counter in Step S72 and the data "IMAIZUMI" is read out from the PHRASE memory 19 in Step S73. This data "IMAIZUMI" and "Dear Mr. [A]" are alternately displayed in a flashing manner on the display 13. Successively, the PME FLAG is set to "10" in Step S75 and the typewriter is set ready to accept data entry through the keyboard 11 after depression of the START key 5. When the START key 5 is depessed in this condition, as indicated in FIG. 5, Steps S12, S13, S21, S60 and S76 are executed. Since the PME FLAG was set to "10" in Step S75, a judgement in Step S76 is affirmative (Y) and the program goes to step S77 wherein the beginning part of the stored text [0] preceding the upper phrase-inserting part 21 is printed by the printer 12. In this particular example, the printing operation is continued until the words "Dear Mr." have been printed. Then, Step S78 is executed to check whether the PHRASE data [A] has been stored or not. If the PHRASE data [A] was not stored, the program goes to the Step S26 previously discussed. In fact, however, the PHRASE data [A] representing the first addressee's name "IMAIZUMI" has been stored as described before and therefore the program goes to Step S79 in which the phrase "IMAIZUMI" is printed by the printer 12.

Then, the display 13 is cleared in Step S26 and the typewriter becomes ready to accept data entry through the keyboard 11.

In the case where the phrase to be inserted in the phrase-inserting part 21, i.e., the addressee's name has been identified by the WORK data [W] during the storage of the TEXT data [0] into the TEXT memory 18, the controller 14 will perform substantially the same processing operation as implemented in the case where the addressee's name has been identified by the PHRASE data, as understood from FIGS. 6 and 5. Described more particularly, Steps S12, S13, S21, S60, S76 and S86 indicated in FIG. 5A are implemented upon depression of the START key 5 after execution of Steps S81 through S85 of FIG. 6. It is noted that, in Step S84, the display 13 provides a flashing alternate display of the read-out WORK data [W] and "Dear Mr. [W]". In other words, there are alternately displayed on the display 13 the data "Dear Mr. [W] (working-group code)", and the contents of the WORK data [W], i.e., phrase-indicating codes in the form of "[A] [B] [C] [D] [E]" representing the stored PHRASE data [A], [B], [C], [D] and [E]. This is contrary to the flashing display in Step S74 wherein the display 13 alternately displays "Dear Mr. [A]" and the contents of the identified PHRASE data, i.e., the addressee's name itself. It is also noted that if the judgement in Step S86 of FIG. 5A is negative (N) denoting the non-establishment of the WME FLAG "10", a buzzer alarm is given in Step S87. In this example, however, the WME FLAG was previously set to "10" in Step S85 and therefore the Step S86 is followed by Steps S88, S89 and S90 which are similar to Steps S77, S78 and S79 executed in the case where the phrase-inserting part 21 is identified by the PHRASE data. In Step S90, the printer 12 prints the contents of the PHRASE DATA [A], i.e., "IMAIZUMI" represented by the first phase-indicating code "A" of the WORK data [W], rather than the phase-indicating code "A". Subsequently, the display 13 is cleared in Step S26 and the typewriter is set ready to accept data entry through the keyboard 11.

As is apparent from the foregoing explanation, the phrases to be inserted into phrase-inserting part 21 of a text are registered in the TEXT memory 18 in the form of phrase-indicating codes "A"-"V" representing the desired phrases stored in the PHRASE memory 19, or in the form of working-group codes "W"-"Z" representing an appropriate group of the stored phrases of the same class. During a printing mode, however, those stored phrases such as addressees' names or other frequently used terms are actually printed in response to the reading of the corresponding phrase-indicating codes or working-group codes which are registered in the appropriate parts of the TEXT data involved.

As described above, the desired phrases to be inserted in the phrase-inserting part 21 of the text [0] can be registered during the storage of the TEXT data [0]. The following parts of the text [0] can be continuously stored in the usual manner. When the lower phrase-inserting part 22 is reached, the same storing procedure as used for the upper phrase-inserting part 21 is employed to register the desired phrase, i.e., the addresser's name in this example, by using the phrase-indicating code or working-group code. At the end of the TEXT data [0], the automatic sheet insertion command indicated before is keyed in for automatic sheet loading and unloading if the typewriter is provided with an automatic sheet insertion unit (27). Then, the END key 6 is depressed for necessary processing within the controller 14 to terminate the data storage into the PHRASE, WORK and TEXT memories 19, 20 and 18. This final processing within the controller 14 is carried out in a usual manner and thus a detailed description thereof is omitted herein.

Figure 8:
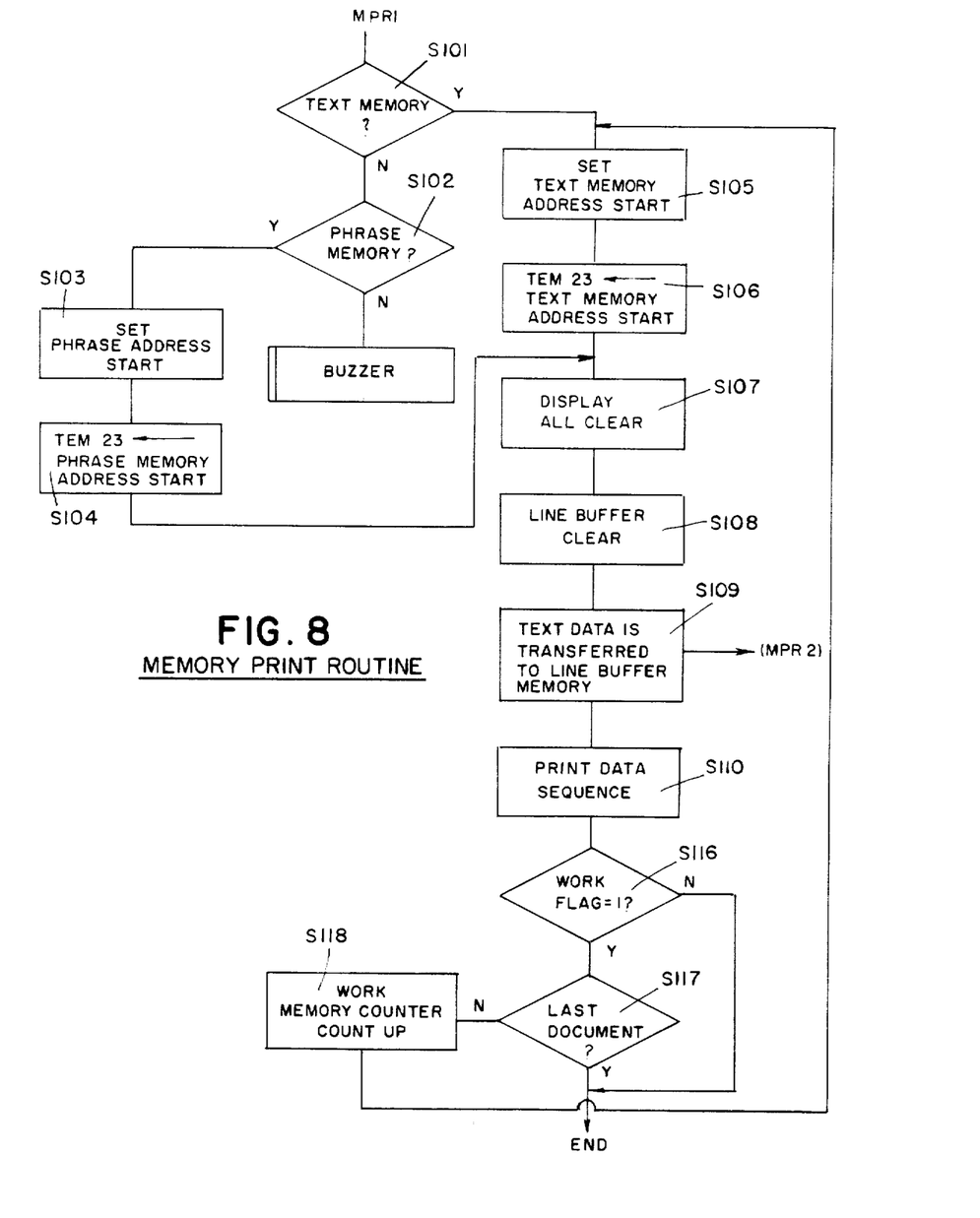
FIG. 8 is a block schematic diagram showing a sequence of operation of a MEMORY PRINT routine.

The operation of printing out the stored TEXT data in conjunction with the PHRASE data will be described below. At first, the STORE mode is changed by the MODE key 4 to a desired printing mode; one of the TYPE, AUTO, JUSTIFY, and LAYOUT modes. Then, the desired set of text data is selected by depressing the corresponding one of the numeral keys "0" through "9" and the CODE key 3. In this condition, the START key 5 is depressed to initiate the printing operation. In this condition, the judgement in Step S12 of FIG. 5A is negative (N). As a result, a MEMORY PRINT routine MPR1 illustrated in FIG. 8 is implemented.

In the routine MPR1, Step S101 is first executed to judge whether the selected TEXT data [0] has been stored in the TEXT memory 18. This judgement step is provided in view of the case where only the PHRASE data is printed. In this case, Steps S102, S103 and S104 are executed. Since the TEXT data [0] has already been stored in this example, the judgement in Step S101 is affirmative (Y) and therefore the Step S101 is followed by Steps S105 and S106 whereby the first address of the TEXT data [0] is written in a temporary memory 23. Successively, the display 13 and a line buffer memory 24 are cleared in Steps S107 and S108, and the TEXT data [0] is sequentially transferred in Step S109 from the TEXT memory 18 to the line buffer memory 24. In the next Step S110, the TEXT data is read out from the buffer memory 24 and printed according to a PRINT DATA sequence.

Figure 9:
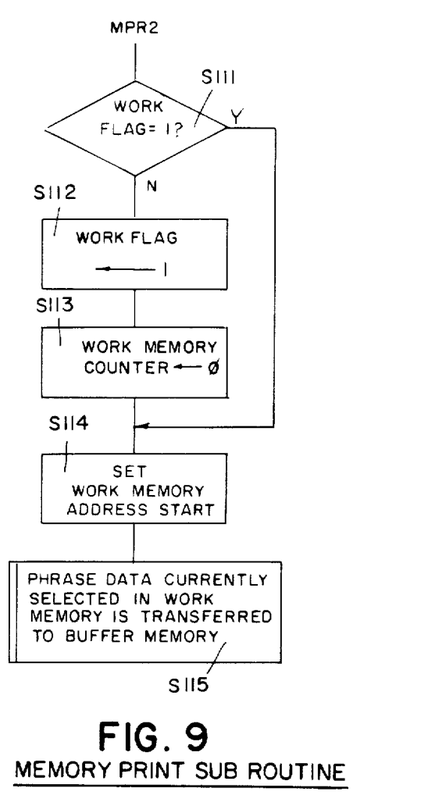
FIG. 9 is a block schematic diagram showing a sequence of operation of a sub-routine of the MEMORY PRINT routine of FIG. 8.

When the working-group code "W" representing the WORK data [W] is read during the printing of the TEXT data [0], a MEMORY PRINT sub-routine MPR2 indicated in FIG. 9 is executed. In this sub-routine, a judgement is made in Step S111 to check whether the WORK FLAG has been established or not. Since this WORK FLAG is initially reset, the program goes to Steps S112 and S113 to establish the WORK FLAG and reset a WORK MEMORY counter to "0". Then, Steps S114 and S115 are executed to transfer to the line buffer memory 24 the PHRASE data represented by the first phrase-indicating code which is currently selected in the WORK data [W]. That is, the PHRASE data [A] representing the first addressee's name "IMAIZUMI" is transferred to the buffer memory 24. Similarly, the PHRASE data [F] representing the addresser's name "UENO" to be inserted in the phrase-inserting part 22 is transferred to the buffer memory 24 when the working-group code "X" of the WORK data [X] is read. It is of course possible to use the WORK data [W] to insert the addressee's name in a phrase-inserting part 25 within the body of the letter as shown in FIG. 3.

After the TEXT data [0] has been entirely transferred to the buffer memory 24 and printed out, Step S116 is executed to judge whether the WORK FLAG has been established or not. Apparently, this judgement is affirmative (Y) and the next Step S117 is implemented to check whether the document which has been prepared is the last one of the plural documents prepared based on the text [A]. This judgement is negative (N) because the document prepared is the first document (letter)

addressed to Mr. Imaizumi. Consequently, the WORK MEMORY counter is incremented in Step S118, and the program returns to Step S105. Subsequently, the portion of the PRINT MEMORY routine MPR1 from Step S105 toward step S118 is repeated to prepare the second document addressed to the second addressee. However, Steps S112 and S113 of the sub-routine MPR2 branched from Step S109 are not executed because the judgement in Step S111 is affirmative (Y). Further, in this sequence of operation associated with the preparation of the second document, the second PHRASE data [B] representing the second addressee's name "Kojima" which is secondly registered in the WORK data [W], is transferred to the buffer memory 24 in Step S115. As for the addresser's name to be inserted into the lower phrase-inserting part 22 of the second document, the phrase-indicating code "F" is also registered in the WORK data [X] to represent the second PHRASE data for the phrase-inserting part 21 of the second document. Therefore, "UENO" is inserted as the addresser's name in the lower phrase-inserting part 22 of the second document, as in the first document.

In the similar manner, the third, fourth and fifth documents are prepared so that the upper phrase-inserting part 21 of the text [0] is filled with the corresponding third, fourth and fifth addressees' names, respectively, but with the lower phrase-inserting part 22 filled with the same addresser's name "UENO". After completion of the five documents based on the text [0], the judgement in Step S117 becomes affirmative (Y) and the program is ended.

In summary, the instant embodiment described hereinbefore permits automatic preparation of five documents, more particularly five letters based on a single text, such that the individual letters all bearing the same addresser's name "UENO" are addressed to different persons, Mr. IMAIZUMI, Mr. KOJIMA, Mr. OGAWA, Mr. MUTOH and Mr. HAYASHI. This preparation of the partially different documents on the same text [0] can be achieved by means of the WORK data [W] which consists of the five phrase-indicating codes "A" through "E" representing the five different phrases [A] through [E] of the same class or group (all addressee's names) through [E], and the WORK data [X] which consists of the five phrase-indicating codes "F" representing the phrase [F] (addresser's name) so as to correspond to the five different addressees. In this embodiment, up to twenty-two phrases represented by respective phrase-indicating codes "A" through "V" may be stored in the PHRASE memory 19, and up to four groups of the phrase-indicating codes may be registered in the WORK memory 20 under respective working-group codes "W" through "Z". In this connection, it is preferable that each of the phrase-indicating codes consists of one or a few characters so that the number of characters of the code is smaller than the number of characters of each phrase represented by the PHRASE code. Further, up to ten texts numbered [0] through [9] may be stored in the TEXT memory 18. With this arrangement, a large number of combinations of such data is possible for automatic reproduction of a selected text with partial alterations from one document to another.

What is claimed is:

1. A method of printing a plurality of documents based on a text, with alterations of phrases from one document to another in at least one phrase-inserting part of the text, comprising the steps of:

storing into a phrase memory plural sets of phrase data representing plural different phrases to be inserted into the respective documents, said sets of phrase data being designated by respective phrase-indicating codes each consisting of at least one character the number of which is smaller than the number of characters constituting each of said plural different phrases;

storing into a work memory at least one set of work data comprising selected plural ones of said phrase-indicating codes in such manner as to specify the order in which said phrase-indicating codes are read out, said work data being designated by a working-group code;

storing into a text memory at least one set of text data representing a text of document, said text data including said working-group code at a position corresponding to said at least one phrase-inserting part of the text;

printing out said text data to produce a first one of said plurality of documents, while upon reading of said working-group code, reading out from said phrase memory and printing out the first set of said phrase data designated by a first one of said phrase-indicating codes of said work data, so as to insert the first phrase into said at least one phrase-inserting part of the text of the first document; and printing out said text data to produce second and subsequent ones of said documents, while printing out second and subsequent sets of said phrase data which are designated by second and subsequent ones of said phrase-indicating codes of said work data, so as to insert the second and subsequent phrases into said at least one phrase-inserting part of the text of the second and subsequent documents.

2. A method as recited in claim 1, wherein said text has plural phrase-inserting parts and said work memory stores plural sets of said work data designated by the respective working-group codes corresponding to said plural phrase-inserting parts, each one set of said work data comprising a group of said phrase-indicating codes of an equal number, said phrase-indicating codes of one set of said work data being sequentially read out from said work memory in combination with the corresponding ones of each other set of said work data, said plural sets of phrase data designated by the read-out phrase-indicating codes being printed out from said phrase memory so that the phrases associated with each one group of said phrase-indicating codes are inserted into one of said plural phrase-inserting parts, and those associated with the other groups are inserted in the other phrase-inserting parts.

3. A method as recited in claim 1, wherein said text memory stores plural sets of said text data representing plural different texts, said plural sets of text data being combined with said plural sets of phrase data to produce a variety of documents, each of said plural sets of text data comprising at least one working-group code designating said work data to represent the different phrases to be inserted.

4. A method as recited in claim 1, wherein each of said phrase-indicating codes and said working-group codes consists of one character.

5. A method as recited in claim 4, wherein said plural sets of phrase data and said at least one set of work data are designated by simultaneous operation of a special function key and one of character keys corresponding to said phrase-indicating code and said working-group code.

6. A method as recited in claim 1, further comprising the step of printing said first document while said text data is stored in said text memory.

7. A method as recited in claim 1, further comprising the step of storing at the end of said text data a command to actuate an automatic sheet inserting unit.

8. A method as recited in claim 1, further comprising the step of indicating alternately at predetermined intervals said phrase-indicating code, and a predetermined number of leading characters of said phrase data designated by the phrase-indicating code, when the phrase-indicating code is entered after the phrase data has been stored in the phrase memory.

9. A method as recited in claim 1, further comprising the step of indicating alternately at predetermined intervals said working-group code, and a predetermined number of leading characters of said work data designated by said working-group code, when the working-group code is entered after the work data has been stored in the work memory.

10. A text processing apparatus for preparing, based on a text, a plurality of documents with partial alterations from one document to another, comprising:
 a memory device including a text memory storing at least one text data representing said text, a phrase memory storing plural sets of phrase data which represent plural different phrases to be inserted into the respective documents and which are designated by respective phrase-indicating codes, and a work memory storing at least one set of work data comprising selected plural ones of said phrase-indicating codes in such manner as to specify the order in which said phrase-indicating codes are read out, said at least one set of work data being designated by a working-group code, said text data including said working-group code at least at one position corresponding to at least one part of said text which is altered from one document to another; and
 a control device for reading out said text data from said text memory plural times corresponding to the number of the documents to be prepared, while upon reading of said working-group code, reading out from said phrase memory said plural sets of phrase data as said plural sets of phrase data are designated in said order by said phrase-indicating codes of said work data which is designated by said working-group code, such that said plural different phrases represented by the sequentially read-out sets of said phrase data are documents.

11. A typewriter having means for preparing, based on a text, a plurality of documents with alterations of phrases from one document to another in at least one phrase-inserting part of the text, which comprises:
 a memory device including a text memory storing at least one text data representing said text, a phrase memory storing plural sets of phrase data which represent plural different phrases to be inserted into the respective documents and which are designated by respective phrase-indicating codes, and a work memory storing at least one set of work data comprising selected plural ones of said phrase-indicating codes in a manner as to specify the order in which said phrase-indicating codes are read out, said at least one set of work data being designated by a working-group code, said text data including said working-group code at a position corresponding to said at least one part of said text;
 a control device for reading out said text data from said text memory plural times corresponding to the number of the documents to be prepared, while upon reading of said working-group code, reading out from said phrase memory said plural sets of phrase data as said plural sets of phrase data are designated in said order by said phrase-indicating codes of said work data which is designated by said working-group code;
 a keyboard through which said text, phrase and work data are keyed into said text, phrase and work memories, respectively, and through which said phrase-indicating codes and said working-group code are registered;
 a printer for printing said text in combination with said plural different phrases designated by the sequentially read-out sets of said phrase data to insert said plural different phrases into said one phrase-inserting part of the text of the respective documents; and
 a display for displaying said text, phrase and work data.

12. A typewriter as recited in claim 11, wherein said display indicates alternately at predetermined intervals said phrase-indicating code, and a predetermined number of leading characters of said phrase data designated by the phrase-indicating code, when the phrase-indicating code is entered through said keyboard after said phrase data has been stored in said phrase memory.

13. A typewriter as recited in claim 11, wherein said display indicates alternately at predetermined intervals said working-group code, and a predetermined number of leading characters of said work data designated by said working-group code, when the working-group code is entered through said keyboard after said work data has been stored in said work memory.

* * * * *